(12) United States Patent
Mondragón

(10) Patent No.: US 10,343,498 B2
(45) Date of Patent: Jul. 9, 2019

(54) COLLAPSIBLE SUNSHADE

(71) Applicant: Remington Industries, Inc., Ooltewah, TN (US)

(72) Inventor: Diner Mondragón, Dalton, GA (US)

(*) Notice: Subject to any disclaimer, the term of this patent is extended or adjusted under 35 U.S.C. 154(b) by 0 days.

(21) Appl. No.: 15/828,305

(22) Filed: Nov. 30, 2017

(65) Prior Publication Data

US 2018/0154741 A1   Jun. 7, 2018

Related U.S. Application Data

(60) Provisional application No. 62/428,620, filed on Dec. 1, 2016.

(51) Int. Cl.
*B60J 11/08* (2006.01)
*B60J 1/20* (2006.01)

(52) U.S. Cl.
CPC .................................. *B60J 1/2091* (2013.01)

(58) Field of Classification Search
CPC .......... B60J 1/2091; B60J 11/00; B60J 1/2011
See application file for complete search history.

(56) References Cited

U.S. PATENT DOCUMENTS

| | | | | |
|---|---|---|---|---|
| 2,736,375 A | * | 2/1956 | Rupert | B60J 11/08 135/19.5 |
| 3,156,497 A | * | 11/1964 | Lessard | B60J 11/08 135/147 |
| 3,373,792 A | * | 3/1968 | Lessard | B60J 11/08 160/370.21 |
| 4,711,260 A | * | 12/1987 | Wiens | A45B 3/00 135/16 |
| 4,805,654 A | * | 2/1989 | Wang | B60J 11/00 135/139 |
| 4,947,499 A | * | 8/1990 | Rilovich | A47C 16/005 5/419 |
| 5,090,435 A | * | 2/1992 | Leclercq | A45B 23/00 135/116 |
| 5,213,123 A | * | 5/1993 | Whitfield | A45B 25/02 135/27 |
| 5,896,880 A | * | 4/1999 | Bushweller | A45B 11/00 135/16 |
| 6,095,230 A | * | 8/2000 | Mitchell | B60J 1/2091 160/370.21 |
| 6,116,256 A | * | 9/2000 | Pawsey | A45B 19/00 135/120.3 |

(Continued)

*Primary Examiner* — Daniel P Cahn
(74) *Attorney, Agent, or Firm* — Frank Marino

(57) ABSTRACT

A vehicular sunshade has a shade panel and an articulating support frame. The panel is made of a flexible opaque material. The frame has extendible arms, a central support, and a yoke. The yoke surrounds the central support and slides relative thereto between distal and proximal ends thereof. The flexible arms are hingedly affixed to the yoke and extend outwardly therefrom. The panel is affixed to the frame. A latch near to the central support's distal end engages the yoke to retain the yoke there-at, to thereby retain the sunshade in an expanded configuration with the flexible arms extended outwardly to cause the panel into a horizontally elongated rectangular planar shape. The latch may be depressed to allow the yoke to slide towards the central support's proximal end to allow the flexible arms to bend at the elbows such that the sunshade is transformed into a compacted storage configuration.

10 Claims, 5 Drawing Sheets

(56) References Cited

U.S. PATENT DOCUMENTS

| | | | | |
|---|---|---|---|---|
| 6,296,005 B1* | 10/2001 | Williams | ............ | A01M 31/025 |
| | | | | 135/901 |
| 6,357,461 B1* | 3/2002 | Chai | ...................... | B60J 1/2011 |
| | | | | 135/117 |
| 6,568,737 B1* | 5/2003 | Li | ........................... | B60J 11/00 |
| | | | | 160/370.21 |
| 9,266,003 B2* | 2/2016 | Luo | .................... | A63B 69/0097 |
| 9,326,573 B1* | 5/2016 | Harris | .................... | A45B 11/00 |
| 9,622,468 B2* | 4/2017 | Downard | ............. | A01M 31/06 |
| 10,076,949 B1* | 9/2018 | Kenney | ...................... | B60J 3/00 |
| 2002/0139403 A1* | 10/2002 | Shi | ......................... | A45B 11/00 |
| | | | | 135/16 |
| 2006/0219278 A1* | 10/2006 | Lohman | ................. | A45B 11/00 |
| | | | | 135/16 |
| 2010/0269873 A1* | 10/2010 | Lee | ........................ | A45B 11/00 |
| | | | | 135/88.05 |
| 2013/0256355 A1* | 10/2013 | Gatto-Weising | ........ | B60R 11/00 |
| | | | | 224/482 |
| 2016/0015137 A1* | 1/2016 | Sasaki | .................... | A45B 25/00 |
| | | | | 135/20.1 |

* cited by examiner

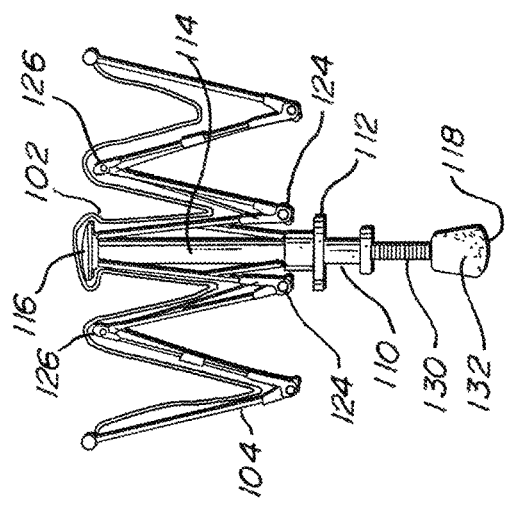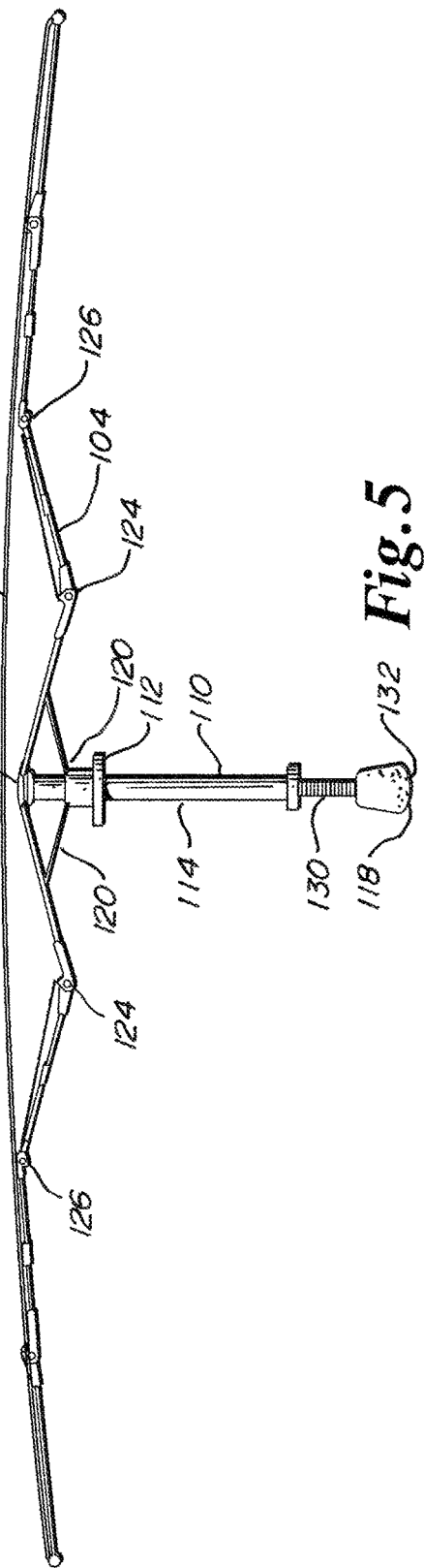

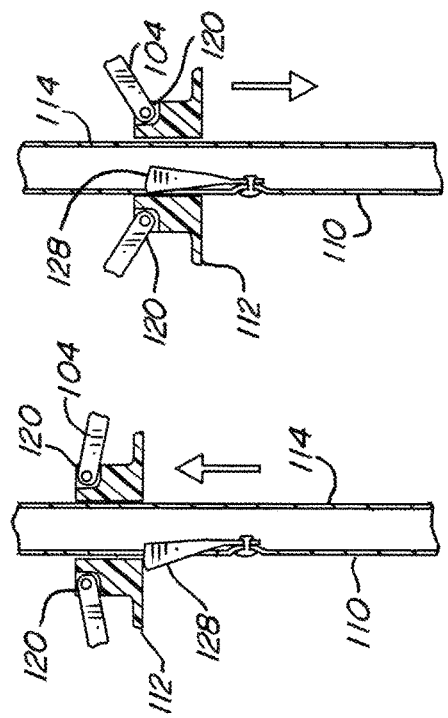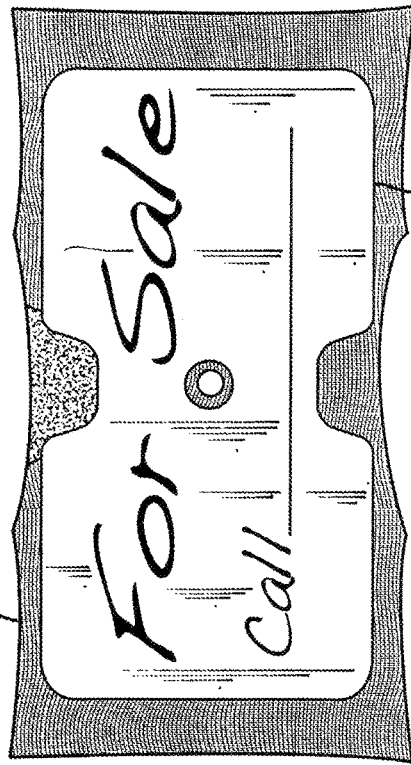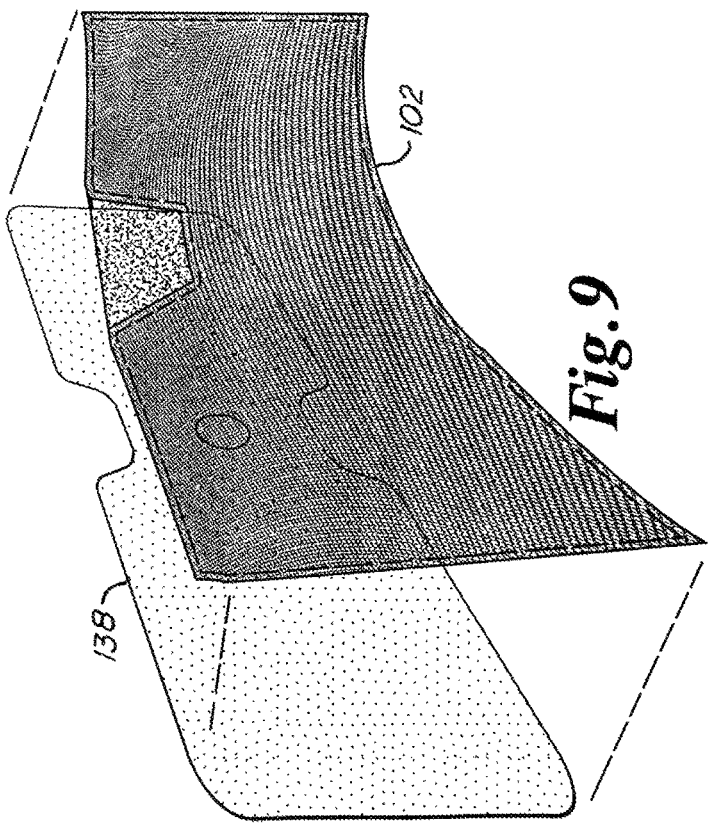

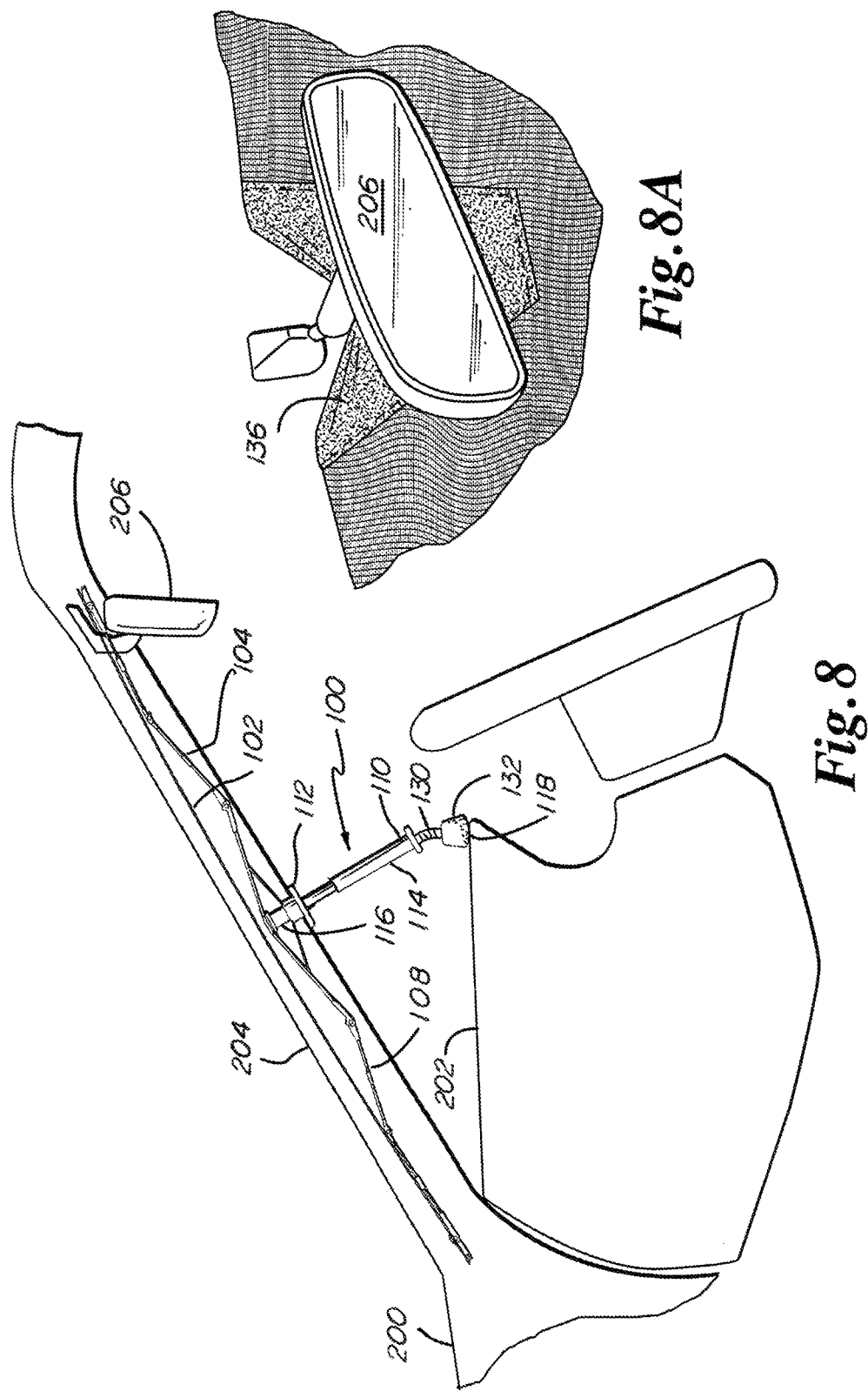

COLLAPSIBLE SUNSHADE

RELATED APPLICATIONS

This application claims all entitled priority to U.S. Provisional Application No. 62/428,620 filed on 1 Dec. 2016, the entire teachings of which are incorporated herein by reference.

FIELD OF THE INVENTION

The present invention is related to devices and systems for shading the interiors of vehicles, such as when left parked in the hot sun. More specifically, the invention relates to a windshield sunshade for use in such shading. Even more specifically, the invention relates to such a sunshade which is adapted for instant conversion between a compact storage configuration and an expanded during-use configuration.

BACKGROUND

Sunshades for automobiles are well known. Such sunshades are commonly large planar panels which are affixable inside the windshield of a vehicle when left parked in the hot sun, to both protect the vehicle's dashboard from damage by the sun and to reduce the heating of the vehicle's interior so that it is more comfortable when the driver returns. Such sunshades require means for affixation to the vehicle during use, and require storage between uses.

Obviously, this poses problems, not limited to the need for affixation means that adapts to the uncountably high number of automobile models, the complexity and effort required to affix and remove the sunshade each time it is used, and the amount of space required to store the large planar sunshade between uses.

Accordingly, there is a need, and it is an object of the invention, to provide a vehicle windshield sunshade which is affixable to the uncountably high number of automobile models. There is also a need, and it is also an object of the invention, to provide such a sunshade which minimizes the complexity and effort required to affix and remove the sunshade each time it is used. There is also a need, and it is also an object of the invention, to provide such a sunshade to reduce the amount of space required to store the sunshade between uses.

Further needs and objects exist which are addressed by the present invention, as may become apparent by the included disclosure of an exemplary embodiment thereof.

SUMMARY OF THE INVENTION

The invention may be embodied in or practiced using a vehicular sunshade which employs an umbrella-type collapsing mechanism, so that it may be quickly and simply affixed inside any windshield regardless of the automobile model, and may be stored in a compact condition by a process that is very familiar to users, and using a mechanism that has an existing history of low cost and high reliability.

The invention may be embodied in or practiced using a sunshade for use in a vehicle having a windshield and a dashboard, the sunshade having a flexible panel, an articulating support skeleton, and a mounting brace. The flexible panel may be affixed to the support skeleton to articulate therewith. The articulating support skeleton may engage the mounting brace through a yoke which is movably secured to the mounting brace. The articulating support skeleton may be convertible with the flexible panel between an expanded state and a compacted state by moving the yoke relative to the mounting brace. A latch may be disposed on the mounting brace for retaining the yoke in a position relative to the mounting brace wherein the panel support skeleton is in the expanded state. The mounting brace may have a bracing proximal end to engage the dashboard to cause and support the expanded articulating panel support skeleton and flexible panel against the windshield. The flexible panel may be in a substantially planar state during the expanded state. The articulating support skeleton may have at least four flexible arms extendible outwardly from the yoke during the expanded state to cause the flexible panel into a horizontally elongated rectangular shape. The yoke may be longitudinally slidable relative to the brace. The at least four flexible arms may be hingedly affixed to the yoke. Sliding the yoke toward the distal end may cause the at least four flexible arms to extend outwardly into the expanded state. The latch may retain the support skeleton in the expanded state by engaging and retaining the yoke at the distal end. The latch may be depressible into the mounting brace to allow the yoke to slide towards the proximal end, thereby allowing the support skeleton and flexible panel into the compacted state. The bracing proximal end may have a flexible portion and a rubbery tip to engage the dashboard. The flexible may have a universally flexible gooseneck mechanism.

The invention may alternatively be embodied in or practiced using a vehicular sunshade having a shade panel and an articulating support frame. The panel may be made of a flexible opaque material having high resistance to sun-induced damage and adapted to prevent through-passage of sunlight. The frame may have four extendible arms, a central support brace, and a yoke. The central support brace may have a cylindrical pole portion with a distal shade end and a proximal bracing end. The yoke may surround the cylindrical pole portion and be adapted to slide relative thereto between the distal and proximal ends thereof. The flexible arms may be hingedly affixed at inner ends thereof to the yoke at equally spaced intervals there-around, and extendible outwardly therefrom towards outer ends thereof. The flexible arms may each include an inner flexible elbow disposed approximately one third of a distance from the arm's inner end to its outer end and allowing the arm to bend inwardly there-at. The flexible arms may each include an outer flexible elbow disposed approximately halfway of the distance from the arm's inner end to its outer end and allowing the arm to bend outwardly there-at. The panel may be affixed to the frame only at points adjacent the distal end of the support brace, the outer ends of the flexible arms, and the outer flexible elbows. The cylindrical pole portion may have a latch near to its distal end for engaging the yoke to retain the yoke there-at, to thereby retain the sunshade in an expanded configuration with the flexible arms extended outwardly to cause the panel into a horizontally elongated rectangular planar shape. The latch may be depressible to allow the yoke to slide towards the cylindrical pole portion's proximal end to allow the flexible arms to bend at the elbows such that the sunshade is transformed into a compacted storage configuration. The cylindrical pole portion may have a telescopically adjustable length. The cylindrical pole portion may have a flexible gooseneck mechanism adjacent its proximal end. The gooseneck portion may be capped by a rubbery foot. The panel may have a strap adapted to wrap there-around during the compacted storage configuration to retain the sunshade therein. The sunshade may have a flexible layer adherable to the panel and having graphics thereon to serve as ornamentality, identification, advertisement, or messaging. The flexible layer may be removably adherable to the panel.

Further features and aspects of the invention are disclosed with more specificity in the detailed description and drawings provided herein.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4 is an elevation view of the sunshade of FIG. 1 during transition between its expanded and contracted configurations;

FIG. 5 is an elevation view of the sunshade of FIG. 1 in its expanded configuration;

FIG. 6 is partial cross-sectional view through the yoke latching mechanism of the sunshade of FIG. 1 during latching;

FIG. 7 is partial cross-sectional view through the yoke latching mechanism of the sunshade of FIG. 1 during unlatching;

FIG. 8 is a cross sectional view through an automobile with the sunshade of FIG. 1 expanded and mounted therein;

FIG. 8A is a partial close-up view of the sunshade of FIG. 1 at the vehicle's rear view mirror;

FIG. 9 is a partial exploded of the shade panel of the sunshade of FIG. 1 having a flexible graphics layer being adhered thereto; and FIG. 10 is a front end view of the expanded sunshade of FIG. 1 with the flexible graphics layer adhered thereto.

DETAILED DESCRIPTION OF EXEMPLARY EMBODIMENTS

Figure 1:
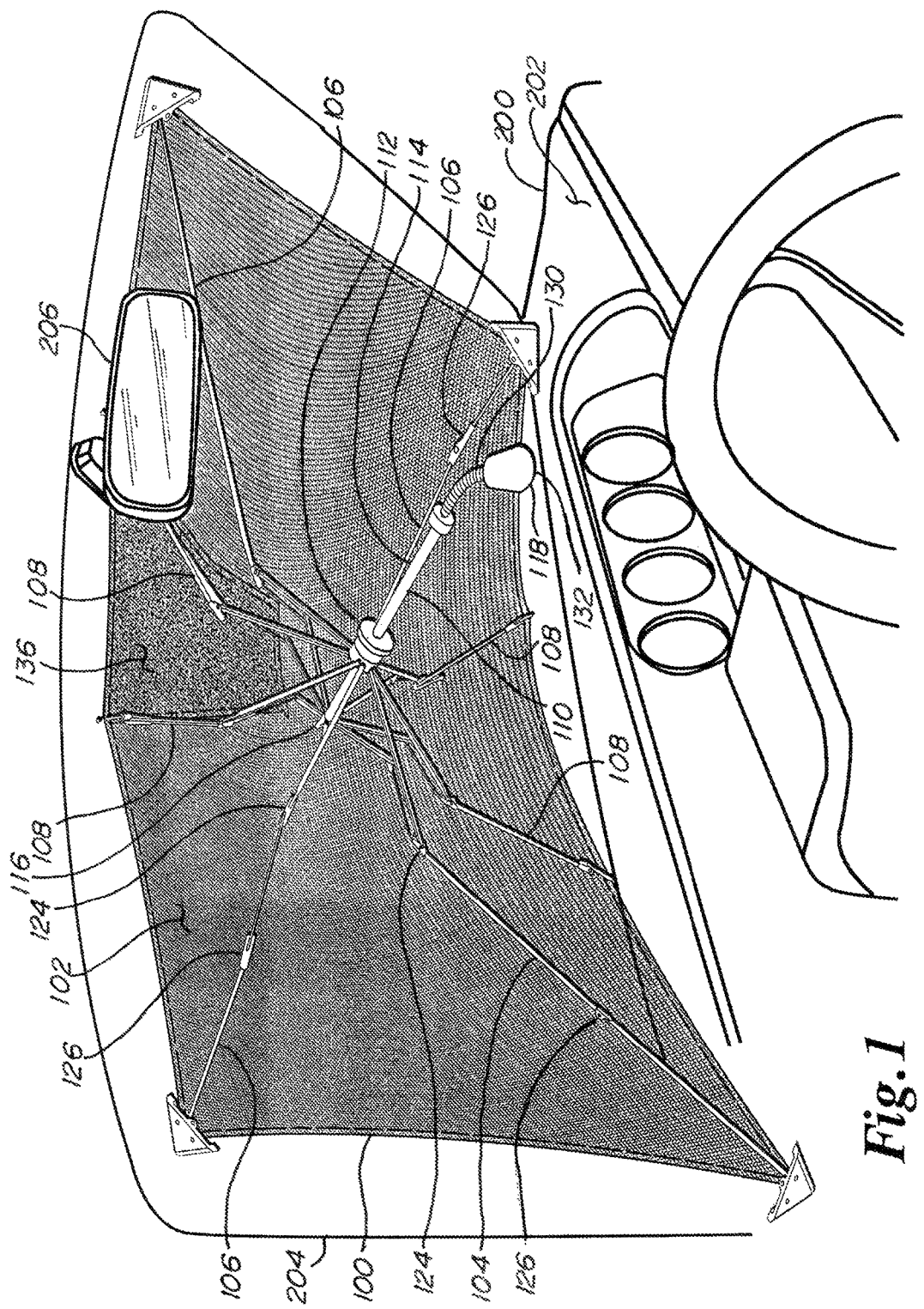
FIG. 1 is a perspective view of an automobile sunshade according to a first exemplary embodiment during use in a vehicle.

Referring to FIGS. 1 through 10, an exemplary sunshade 100 in accordance with or useful in practicing the invention is shown, in conjunction with a typical vehicle 200.

Sunshade 100 includes a shade panel 102 and a preferably metal articulating support frame 104.

The panel is preferably a flexible opaque material, such as a fabric or polymeric film, which is selected from materials having high resistance to sun damage and which block the through-passage of sunlight, especially in the ultraviolet spectrum.

The frame is made of eight flexible arms, four corner arms 106 and four shorter inboard arms 108, a central support brace 110, and a yoke 112.

The support brace includes a cylindrical pole portion 114 with a shade end 116 and a support end or bracing end 118.

The yoke surrounds the pole portion and is adapted to slide freely up and down relative thereto.

The eight flexible arms are hingedly affixed at their inner ends 120 at equally spaced intervals around the yoke and extend outwardly therefrom in a "spider web" configuration towards their outer ends 122.

The flexible arms each include an inner flexible elbow 124 disposed approximately one third of the arm's length from the yoke, that allows the arm to bend inwardly there-at, and an outer flexible elbow 126 disposed approximately halfway of the arm's length from the yoke, that allows the arm to bend inwardly there-at.

The panel is affixed to the frame only at points at the distal shade end of the support brace, the outer ends of each flexible arm, and adjacent the outer flexible elbows. Such affixation is preferably by stitching, but may be accomplished by any other known means.

Referring to FIG. 6, the cylindrical pole portion includes latch 128 near to its shade end which engages the yoke to retain the yoke when it is slid fully thereto, and thereby retains the sunshade in the expanded configuration of FIGS. 1 and 4. The latch is preferably made of a flexible metal, such as spring steel.

Figures 2, 3:
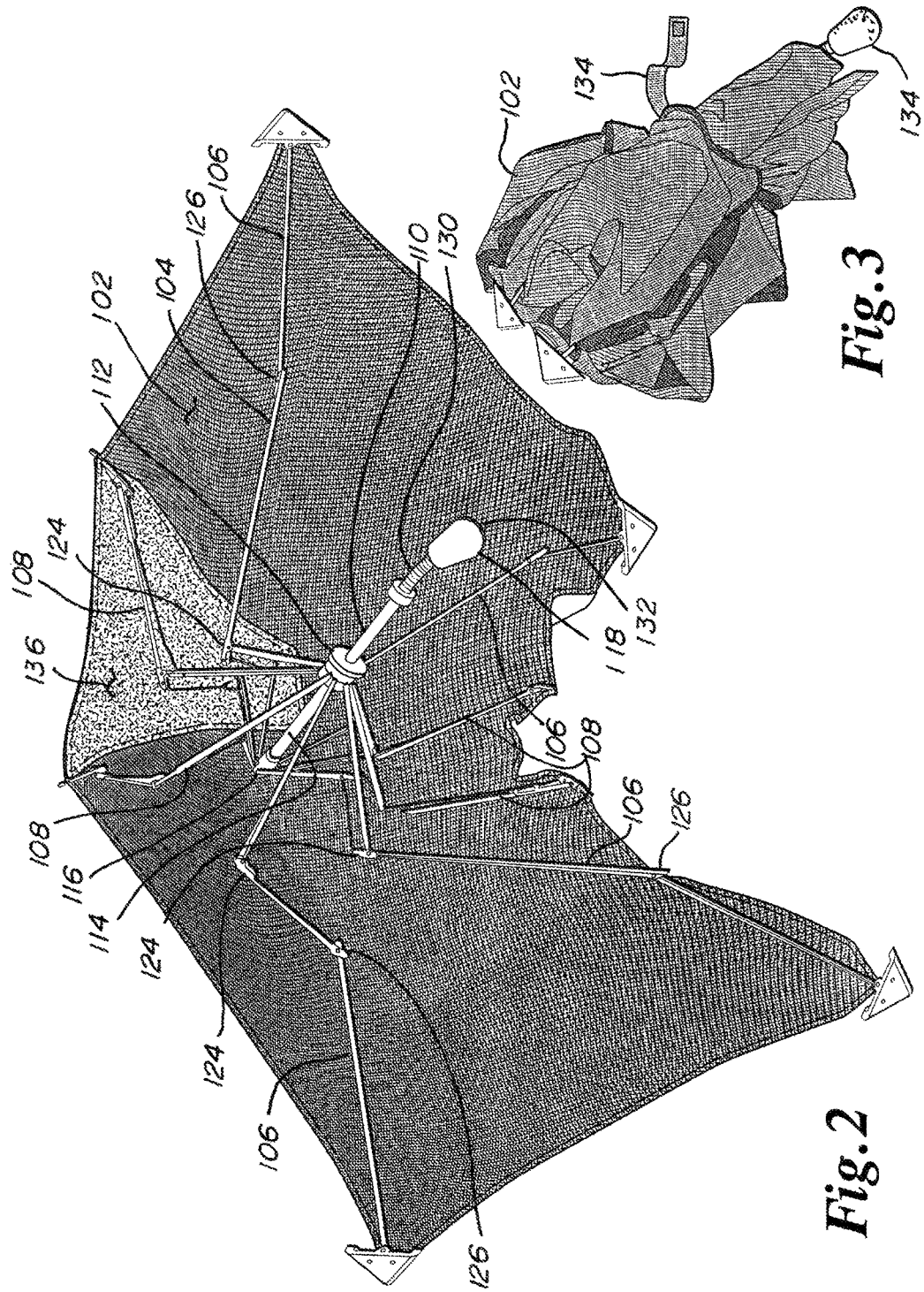
FIG. 2 is a perspective view of the sunshade of FIG. 1 being compacted for storage.
FIG. 3 is a perspective view of the sunshade of FIG. 1 in its compacted storage configuration.

As seen in FIG. 7, by depressing the latch inwardly into the pole portion, the yoke is allowed to slide down the central pole portion to allow the sunshade to be transformed into its compacted storage configuration of FIGS. 3 and 4.

As best seen in FIG. 8, the support brace has is arranged to adapt to and secure the sunshade within a large variety of vehicles. The pole portion "telescopes" to adjust its length. A common "twist-extend-untwist" arrangement fixes the pole portion at the desired length. A flexible "gooseneck" portion 130 at its proximal support end allows the brace to be shaped and seated against any available nearby feature within the vehicle, preferably the vehicle's dashboard 202, to thereby squeeze the sunshade firmly into position and hold it there until removed. Such gooseneck mechanisms are well known and commonly used in such things as desk lamps to allow lamp to be directed as desired. The specific constructions of such mechanisms are beyond the scope of this disclosure, and the particular type of such well-known mechanisms used should not be a limiting feature of the invention. As the term is used herein, a gooseneck mechanism is simply any universally flexible elongated component that is rigid enough to remain in the position to which it is flexed until forcefully flexed into some other shape. Gooseneck portion 130 of the is capped by a rubbery foot 132, which provides friction to prevent slipping and protects the vehicle.

When the sunshade is expanded and the shade panel is positioned against the inside of the windshield 204 of the vehicle 200, the pole portion is telescoped and fixed to the desired length, and the gooseneck portion is bent to force the rubbery foot against the dashboard, and the sunshade it thereby held in position, as seen in FIGS. 1 and 8, until removed.

Referring to FIG. 8A, because many vehicles have their rearview mirrors affixed near to the center top of their windshields, the shade panel includes a stretchable sub-panel 136 in that region, this allows the shade panel to conform around or over the mirror 206 when required. The sub-panel may be made of a material such as "spandex".

Once use of the sunshade is concluded, the rubbery foot is simply pulled from the dashboard, the pole is shortened, the latch is depressed, the yoke is retracted towards the support end of the pole portion, and the frame and shade panel are folded into the compacted state of FIG. 3 for storage. Strap 134 wraps around the folded panel and secures to itself by hook/loop fastening or metal snaps to retain the sunshade in this compacted state.

FIGS. 9 and 10 show the optional use of a decorative flexible layer 138 adhered to the windshield-side of the sunshade panel to provide an ornamental effect to passersby.

The decorative layer may be removable and replaceable, such as by hook/loop fastening or metal snaps, so that a consumer may purchase numerous different layers for say various days of the week or to express different messages. The layers may be customizable to thereby allow the user to create an identifier, an advertisement, or a message according to their needs.

It should be noted that the embodiment shown herein is not intended to limit the scope of the invention. The invention therefore only be limited by the follow claims, including any equivalent interpretation to which they are entitled.

I claim:

1. A sunshade for use in a vehicle having a windshield and a dashboard, the sunshade comprising:
   a flexible panel, a mounting brace, and an articulating support skeleton;
   the flexible panel being affixed to the articulating support skeleton to articulate therewith;
   the mounting brace having a bracing proximal end and a distal end;
   the articulating support skeleton engaging the mounting brace through a yoke which is secured onto the mounting brace and configured to slide between the proximal and distal ends, wherein the articulating support skeleton is configured to convert the flexible panel between an expanded state and a compacted state as a direct result of sliding the yoke along a major length of the mounting brace between the proximal and distal ends, wherein the distal end is adjacent to the flexible panel when in the expanded state so that the proximal end is configured to engage the dashboard as the flexible panel is pressed up against the windshield during a use position;
   a latch disposed on the mounting brace and configured to retain the yoke in a latched position relative to the mounting brace when the articulating support skeleton is in the expanded state, wherein the latch is configured to lock the support skeleton in the expanded state by engaging the yoke at the distal end, and the latch being depressible into the mounting brace in order to disengage the yoke in order to slide the yoke towards the proximal end, thereby allowing the support skeleton and the flexible panel to move into the compacted state in which the flexible panel and articulating support skeleton are folded up beside the mounting brace;
   the flexible panel is planar and rectangular when in the expanded state, the flexible panel is attached to a stretchable sub-panel extending through an opening of the flexible panel, wherein the sub-panel is configured to stretch to conform around a rear view mirror on the windshield to avoid the rearview mirror when the sunshade is in the use position and in the expanded state;
   wherein the articulating support skeleton comprises at least four flexible arms hingedly affixed to the yoke so that sliding the yoke from the proximal end toward the distal end causes the at least four flexible arms to unfold and extend outwardly into the expanded state; and,
   the proximal end comprises a universally flexible gooseneck mechanism terminating with a rubbery tip, the gooseneck mechanism is configured to be manipulated so that the rubbery tip engages the dashboard in order to support the sunshade in the use position against the windshield.

2. The sunshade of claim 1 further in combination with the vehicle having the windshield and the dashboard.

3. The sunshade of claim 1 wherein the mounting brace has an adjustable length.

4. The sunshade of claim 1 further in combination with the vehicle having the windshield and the dashboard, wherein the mounting brace has an adjustable length.

5. The sunshade of claim 1 wherein the flexible panel further comprises a strap adapted to wrap there-around when in the compacted state to retain the sunshade therein.

6. The sunshade of claim 1 further comprising a flexible layer adherable to the flexible panel and having graphics thereon for ornamentality, identification, advertisement, or messaging.

7. The sunshade of claim 6 wherein the flexible layer is removably adherable to the flexible panel.

8. The sunshade of claim 1 further in combination with the vehicle having the windshield and the dashboard, wherein the flexible panel further comprises a strap adapted to wrap there-around when in the compacted state to retain the sunshade therein.

9. The sunshade of claim 1 further in combination with the vehicle having the windshield and the dashboard, and further comprising a flexible layer adherable to the flexible panel and having graphics thereon for ornamentality, identification, advertisement, or messaging.

10. The sunshade of claim 6 further in combination with the vehicle having the windshield and the dashboard, wherein the flexible layer is removably adherable to the flexible panel.

* * * * *